United States Patent [19]
Wagner

[11] Patent Number: 6,071,445
[45] Date of Patent: Jun. 6, 2000

[54] PROCESS FOR FORMING PLASTICS

[76] Inventor: Curtis D. Wagner, P.O. Box 840885, Houston, Tex. 77284-0885

[21] Appl. No.: 09/109,287

[22] Filed: Jun. 30, 1998

[51] Int. Cl.[7] .......................... B29C 43/04; B29C 43/58; B29C 51/08; B29C 51/46; B29C 71/02

[52] U.S. Cl. .......................... 264/40.1; 264/130; 264/153; 264/40.6; 264/320; 264/322; 264/348; 425/157; 425/158; 425/160; 425/395; 425/400

[58] Field of Search ................................. 264/40.1, 40.6, 264/519, 153, 319, 320, 322, 327, 348, 138, 237, 130; 425/157, 158, 160, 297, 355, 395, 400, 408; 156/211, 221, 228; 432/31, 51, 52

[56] References Cited

U.S. PATENT DOCUMENTS

| | | | |
|---|---|---|---|
| 2,305,433 | 12/1942 | Kyle | 264/348 |
| 3,020,596 | 2/1962 | Clapp et al. | 264/322 |
| 3,084,389 | 4/1963 | Doyle | 264/348 |
| 3,404,056 | 10/1968 | Baldwin | 264/322 |
| 3,593,376 | 7/1971 | Kisker et al. | |
| 3,954,374 | 5/1976 | Wommelsdorf et al. | 425/388 |
| 4,275,864 | 6/1981 | Richards | 264/348 |
| 4,357,381 | 11/1982 | Wilson | 428/174 |
| 4,390,489 | 6/1983 | Segal | 264/126 |
| 4,436,685 | 3/1984 | Emura et al. | 264/148 |
| 4,705,930 | 11/1987 | Sathre, Jr. et al. | 219/492 |
| 4,994,133 | 2/1991 | Oizumi et al. | 156/270 |
| 5,573,814 | 11/1996 | Donovan | 427/448 |
| 5,858,414 | 1/1999 | Hayashi et al. | 425/73 |

*Primary Examiner*—Jan H. Silbaugh
*Assistant Examiner*—Michael I. Poe
*Attorney, Agent, or Firm*—Keeling Law Firm

[57] ABSTRACT

A method of forming plastics which comprises the sequential steps of cutting a plastic piece from a sheet of plastic, heating both sides of the plastic piece by contact heating, molding the heated plastic piece into its end-shape by press-molding, and cooling the heated and molded plastic piece into its end shape by air cooling means. In the preferred embodiment, the plastic piece, which may be laminated on one or both of its sides, is heated by use of a heating press which compresses the plastic piece thereby preventing "wrinkling" or warping of either side of the plastic piece. Thereafter, in the preferred embodiment, the heated plastic piece is positioned in a press-molding mechanism which comprises specially made male-female dies. Preferably, the air cooling step of the method takes place during the latter part of the press-molding step whereby both steps are, at some period, occurring concurrently. Also in the preferred embodiment, the heating press and the press-molding mechanism include a centering mechanism which ensures the correct placement of each plastic piece on the male/female dies of press-molding mechanism. The method is specially useful to suitably form pre-laminated plastic sheets.

17 Claims, 2 Drawing Sheets

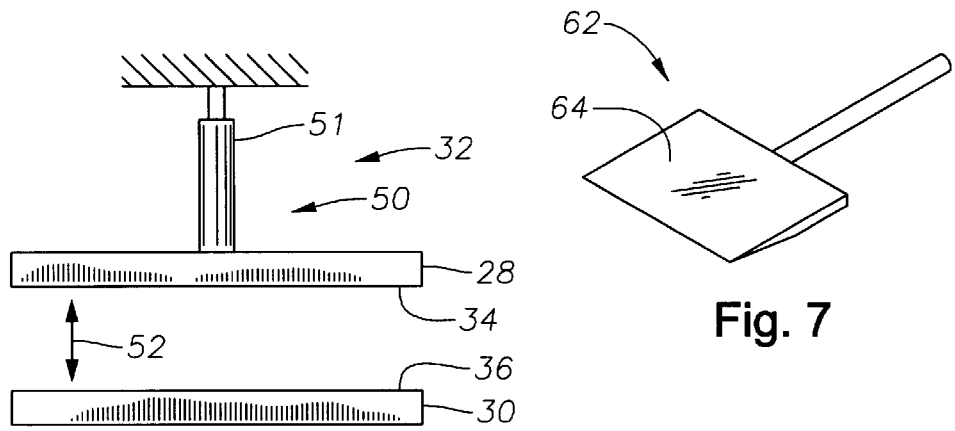
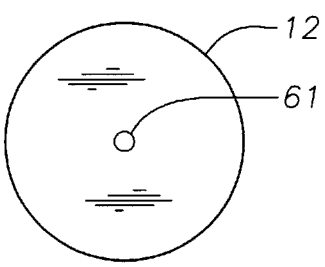
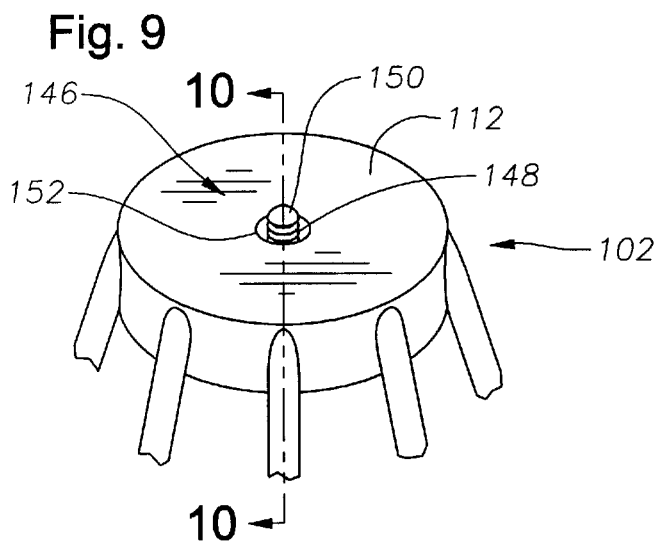
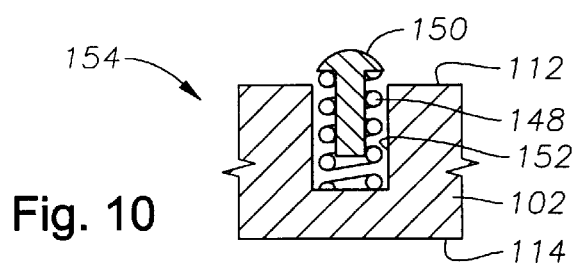
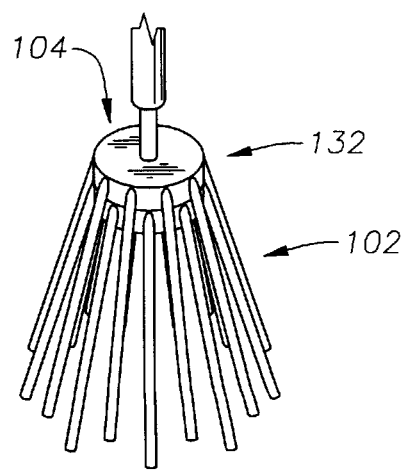
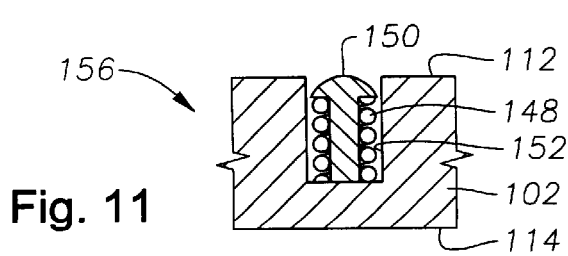

PROCESS FOR FORMING PLASTICS

BACKGROUND OF THE INVENTION

1. Field of Invention

This invention relates generally to a process for forming plastics. More specifically, this invention relates to a process, which utilizes conductive heating, for press-forming pre-laminated plastics from pre-cut plastic patterns.

Generally, in order to successfully mold a rigid piece of plastic into a different shape, the rigid plastic piece must first be heated. At a certain temperature, the rigid plastic piece becomes flexible. Once the plastic piece is sufficiently flexible, it is molded into the desired shape. After the plastic piece possesses the desired shape, the plastic piece is cooled and is thereby stabilized into the shape desired for the end product.

A few prior art plastic forming methods heat the plastic piece after the piece has been cut from a plastic sheet. On the other hand, most methods heat a specific section of a plastic sheet while that section is still part of the sheet, mold that section of the plastic sheet into the end-shape, and thereafter cut the plastic piece from the relevant section of the plastic sheet. Normally, the latter method stretches the relevant heated section of plastic sheet into the end-shape of the plastic piece thereby thinning the width of the resultant end product. Thus, it is preferable to use the former method, in which the end product is not made up of "thinned" plastic.

Generally, there are two types of heating which are used to heat plastic: [1] conductive or "contact" heating and [2] convective or "radiant" heating. Conductive heating occurs when the plastic is in direct contact with the heating element, wherein heat is transferred directly from the heating element to the plastic. Radiant heating occurs when the plastic is not in direct contact with the heating element, wherein heat is transferred indirectly from the heating element through the intermediary fluid (usually air) and to the plastic.

Each form of heating possesses drawbacks. For instance, in conductive heating, if one side of the plastic is exposed (ie., not heated), that side will likely "wrinkle" thereby making that piece of plastic unusable as an end product. Furthermore, using conductive heating, care must be taken so that the plastic does not melt into or adhere to the heating element. With respect to convective heating, since fluids tend to have lower thermal conductivities than solids, the degree of heat which the heating element must emit in radiant heating in order to raise the temperature of the plastic to an adequate level is usually much higher than the degree of heat required for conductive heating to raise the temperature of the same plastic to the same level. It would thus be beneficial to the prior art to develop an improved method of forming plastics which utilizes conductive heating but which does not suffer from the listed drawbacks of conductive heating.

The problems of convective heating are exacerbated if the plastic being heated is pre-laminated since the lamination and the plastic itself have different thermal conductivity coefficients. In addition, pre-laminated plastic sheets which are subjected to radiant heating typically do not heat evenly throughout, leading to difficulties in the molding step of the process. Nevertheless, the use of pre-laminated sheets is favored due to the additional long-lasting qualities which the lamination provides to the end product. Additionally, pre-laminated sheets are often desired for aesthetic reasons.

Two types of molding methods are predominantly used in prior art systems. Press molding compresses the plastic piece into its end shape, usually by using mating female and male dies. Vacuum molding utilizes a suction pressure to mold the flexible, heated plastic piece into its end shape. An inherent limitation in vacuum molding is that its efficiency and precision depends largely on the power of the vacuum/suction mechanism. It would thus be beneficial to the prior art to develop an improved method of forming plastics which utilizes press-molding instead of vacuum molding.

The great majority of prior art systems utilize water cooling mechanisms to cool the plastic subsequent to its heating phase. Other systems utilize air or a combination of water and air to achieve the same purpose. Using water based (including partially water based) cooling methods requires complicated equipment for routing and pumping the water towards the heated plastic. It would thus be beneficial to the prior art to develop an improved method of forming plastics which utilizes air cooling.

Collectively, and more particularly, it would be beneficial to develop a method of forming plastics which heats a plastic piece after it has been cut from a sheet of plastic (thereby eliminating the "thinning" plastic problem), utilizes conductive heating to heat the plastic piece on both of its sides while providing a means to inhibit melting of the plastic, utilizes press-molding instead of the more limiting vacuum molding, and utilizes air cooling to cool the heated and molded plastic piece (thereby eliminating the need for a complex water cooling mechanism). Further, it would be beneficial to the prior art to provide a method which can effectively form pre-laminated plastic sheets.

2. Related Art

Although methods of forming plastics are known in the art, the Applicant is unaware of a prior art method which utilizes the steps as previously listed herein. Specifically, the Applicant is unaware of a prior art method which utilizes the steps as previously listed herein to form a pre-laminated plastic sheet. Illustrative of known prior art methods are U.S. Pat. No. 2,305,433 which issued to Kyle in 1942, U.S. Pat. No. 3,020,596 which issued to Clapp et al. in 1962, U.S. Pat. No. 3,084,389 which issued to Doyle in 1963, U.S. Pat. No. 3,404,056 which issued to Baldwin in 1968, and U.S. Pat. No. 4,275,864 which issued to Richards in 1981.

U.S. Pat. No. 2,305,433 ("the '433 Patent") discloses a Method and Apparatus for Molding Articles of Thermoplastic, Thermosetting, or Resinous Materials. The '433 Patent utilizes two sets of male and female dies (one set for heating and one set for cooling) and at least one shell, which assembly allows for the quick re-use of the set of heating dies.

Although the '433 Patent discloses heating both sides of a plastic piece by use of pressure and contact, the type of heating taught by the '433 Patent is not pure and direct contact heating. In the '433 Patent, heat is transferred from one or two heating dies through an adjacent shell, which is not part of the end-product and is subsequently removed, and finally into the plastic. The indirect conductive heat transfer taught by this Patent results in a lower overall thermal conductivity coefficient than if direct contact heating were used. It is noted, however, that the '433 Patent would not operate without the use of the disclosed shells.

Furthermore, the '433 Patent teaches that the heating and molding steps of the method occur concurrently. The shape of the end product for this method is thus inherently limited to the shape of the mold/heating structure. On the other hand, if the heating and molding steps are carried out independently from each other, the plastic piece, once it has been heated, may be used in a vast number and shape of molds.

U.S. Pat. No. 3,084,389 ("the '389 Patent") discloses a Plastic Molding Process and Apparatus. The '389 Patent teaches a faster cooling method for a heated piece of plastic, comprising the sequential steps of skin hardening the plastic with a cooling gas (ie., air) and then spraying the plastic with a water or liquid mist. The '389 Patent does not utilize contact heating and utilizes vacuum molding instead of press molding.

SUMMARY OF THE INVENTION

Accordingly, the objectives of this invention are to provide, inter alia, a method and apparatus for forming plastics that:

- heats the plastic piece after it has been cut from a sheet of plastic;
- utilizes conductive heating to heat the plastic piece on both of its sides while providing a means to inhibit melting of the plastic;
- utilizes press-molding to mold the heated plastic piece into its end shape;
- utilizes air cooling to cool the heated and molded plastic piece; and,
- is able to suitably form pre-laminated plastic sheets.

To achieve such improvements, my invention is a method of forming plastics which comprises the sequential steps of cutting a plastic piece from a sheet of plastic, heating both sides of the plastic piece by contact heating, molding the heated plastic piece into its end-shape by press-molding, and cooling the heated and molded plastic piece into its end shape by air cooling means. In the preferred embodiment, the plastic piece, which may be laminated on one or both of its sides, is heated by use of a heating press which compresses the plastic piece thereby preventing "wrinkling" or warping of either side of the plastic piece. Thereafter, in the preferred embodiment, the heated plastic piece is positioned in a press-molding mechanism which comprises specially made male-female dies. Preferably, the air cooling step of the method takes place during the latter part of the press-molding step whereby both steps are, at some period, occurring concurrently. Also in the preferred embodiment, the heating press and the press-molding mechanism include a centering mechanism which ensures the correct placement of each plastic piece on the male/female dies of press-molding mechanism. The method is specially useful to suitably form pre-laminated plastic sheets.

BRIEF DESCRIPTION OF THE DRAWINGS

FIG. 6 is a front elevational view of another embodiment of the heating press in the open position.

FIG. 7 is an isometric view of the removal tool.

FIG. 8 is a top view of the plastic piece with a center mark thereon.

FIG. 9 is an isometric view of the top half of the male mold section with centering mechanism.

FIG. 10 is a cross-sectional view along line 10—10 of FIG. 9 of the centering mechanism in the extended position.

FIG. 11 is a cross-sectional view along line 10—10 of FIG. 9 of the centering mechanism in the retracted position.

FIG. 12 is a side elevational view of a preferred embodiment of the molding mechanism in the pressed position.

DETAILED DESCRIPTION OF THE INVENTION

The preferred embodiment of my invention is shown in FIGS. 1 through 12 and the process of forming plastics is depicted as shown. Generally, the process 10 comprises, in sequence, cutting a plastic sheet into a plastic piece with a pre-determined pattern; heating the plastic piece by conductive heating on both of its sides; molding the heated plastic piece into its end-shape; and cooling the molded, heated plastic piece thereby hardening the plastic into the end-shape.

The process 10 may be utilized with certain types and thicknesses of plastics. Plastics which may be utilized with this process 10 include polyvinyl chloride and high impact styreen. The minimum thickness for the plastics is approximately 15 mils (15 thousandths of an inch) and the maximum thickness is approximately 50 mils (50 thousandths of an inch). These minimum and maximum thicknesses have been determined by the Applicant through testing.

Figure 1:
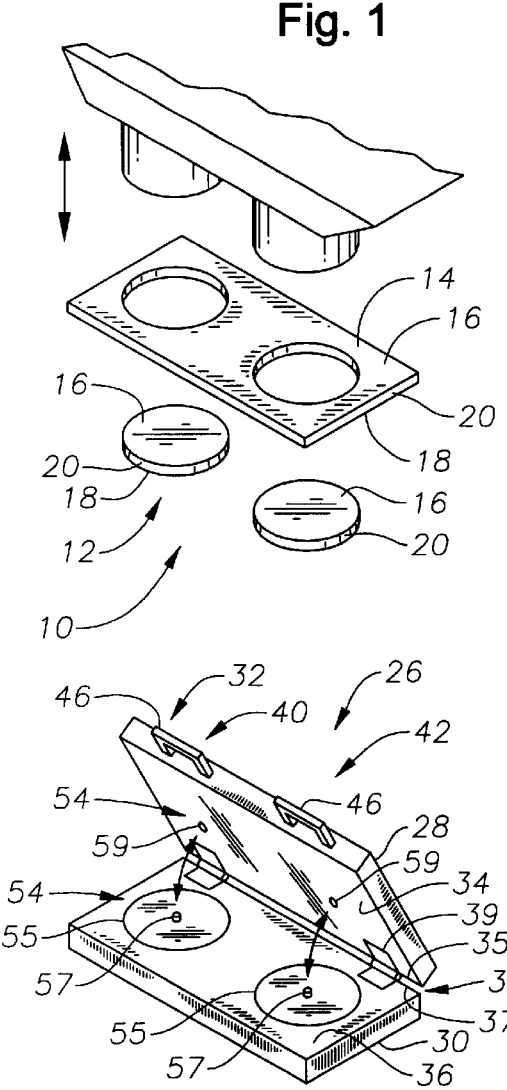
FIG. 1 is an isometric elevational view of the die cutting means of the process.

As shown in FIG. 1, the first step of the process 10 is to cut a plastic piece 12 with a predetermined pattern from a plastic sheet 14. Plastic piece 12 is cut from plastic sheet 14 by typical, well-known plastic cutting methods as shown in FIG. 1, such as die-cutting. Plastic sheet 14, as well as plastic piece 12, includes a first side 16, a second side 18, and a thickness 20.

The initial shape of plastic piece 12 after it is cut from plastic sheet 14 is one of the factors that dictates the end-shape of the product produced by the the process. In one embodiment of the process, the shape of the plastic piece 12 is circular. In another embodiment of the process, the shape of the plastic piece 12 is square. Each of the two initial shapes results in a differently shaped end product. It is understood, however, that plastic piece 12 may have any initial shape.

Figures 4, 5:
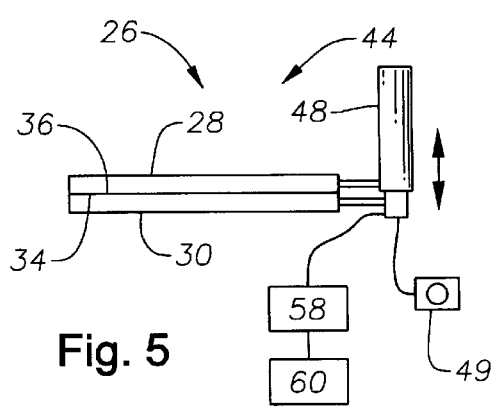
FIG. 4 is a side elevational view of the plastic sheet pre-laminated on both of its sides.
FIG. 5 is a front elevational view of a preferred embodiment of the heating press in the closed position.

Importantly, as shown in FIG. 4, in the preferred embodiment, plastic sheet 14 is pre-laminated, including lamination 22 on one or both of its sides, 16 and/or 18. In addition, in another preferred embodiment, plastic sheet 14 includes a silicone coating (not shown) on one or both of its sides, 16 and/or 18. It is noted that, if plastic piece 12 includes lamination 22, then silicone coating is located on the outer surface of lamination 22.

After the plastic piece 12 is cut from the plastic sheet 14, the plastic piece 12 is then heated on both of its sides, 16 and 18. It is imperative that the plastic piece 12 be heated on both of its sides, 16 and 18, and that such heating be conductive or "contact" heating as opposed to convective or "radiant" heating. It is also essential that such heating be direct contact heating as opposed to indirect contact heating, in which instance heat is transferred from the heating element, through an intermediary solid, that is not part of the end-product, and into the plastic.

Figure 2:
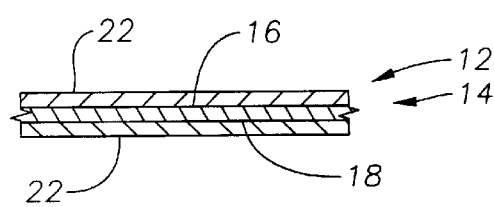
FIG. 2 is an isometric view of a preferred embodiment of the heating press in the open position.
Figure 3:
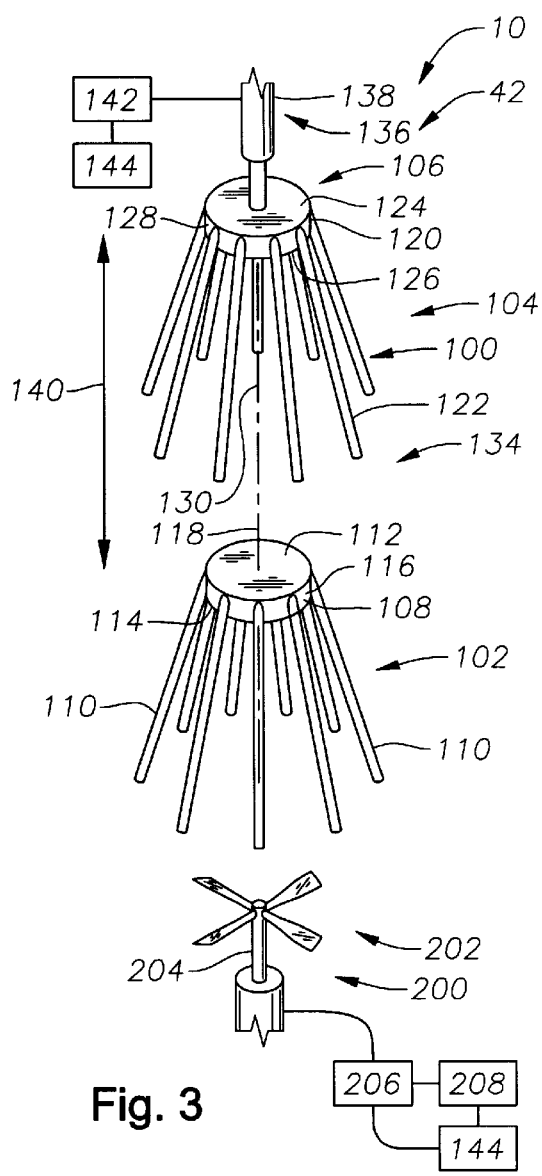
FIG. 3 is an isometric view of a preferred embodiment of the molding mechanism in the pulled position and of the cooling mechanism.

In the preferred embodiment, the plastic piece 12 is heated by a heating press 26, which uses conductive heating to heat both sides, 16 and 18, of the plastic piece 12. As best shown in FIG. 2, heating press 26 comprises a first heating element 28, a second heating element 30, and a press means 32. First heating element 28 includes at least one heated side 34. Similarly, second heating element 30 includes at least one heated side 36. Generally, press means 32 selectively brings first heating element 28 and second heating element 30 to and from a closed position 44 (as shown in FIG. 5), in which first heating element heated side 34 abuts second heating element heated side 36, and an open position 42 (as shown in FIG. 2), in which first heating element heated side 34 is displaced a distance away from second heating element heated side 36.

First and second heating elements, 28 and 30, and their respective heated sides, 34 and 36, may be heated by any of a large variety of heating means, such as internal resistors. First heating element heated side 34 and second heating element heated side 36 must be sized and shaped so that they fully cover plastic piece 12 when heating press 26 is in the closed position 44. In the preferred embodiment, first heating element heated side 34 and second heating element heated side 36 have equal sizes and shapes.

In one preferred embodiment, as shown in FIG. 2, press means 32 comprises a means for hingedly attaching 38 and an actuating means 40. Means for hingedly attaching 38 hingedly attaches first heating element 28 to second heating element 30, allowing the elements, 28 and 30, to pivot to and from open position 42 and closed position 44. In the preferred embodiment, means for hingedly attaching 38 comprises at least one hinge 39 attached to one edge 35 of first heating element heated side 34 and to a corresponding edge 37 of second heating element heated side 36.

Actuating means 40 actuates the pivoting of first and second heating elements, 28 and 30, about means for hingedly attaching 38 to and from the open and closed positions, 42 and 44. In one embodiment, actuating means 40 comprises at least one handle 46 on the uppermost of first and second heating elements, 28 and 30, which is used by a user to selectively move press means 32 to and from open position 42 and closed position 44. In another embodiment, press means 32 comprises a piston 48, such as a pneumatic, hydraulic, or mechanical piston, which is activated by depressing a button 49 located externally to heating press 26.

In another preferred embodiment, as shown in FIG. 6, press means 32 comprises a hydraulic compression means 50. In this embodiment, when heating press 26 is in the open position 42, a cylinder 51, such as a pneumatic cylinder, maintains the first heating element 28 a vertical distance 52 away from second heating element 30 so that first heating element heated side 34 is proximate second heating element heated side 36. When activated, cylinder 51 moves first heating element heated side 34 into (the closed position 44) and out of (the open position 42) abutment with second heating element heated side 36. Preferably, in this embodiment, first heating element heated side 34 is substantially parallel to second heating element heated side 36 when heating press 26 is in the open position 42. It is understood that first heating element heated side 34 must always be parallel to second heating element heated side 36 when both sides, 34 and 36, are in abutment in the closed position 44.

Initially, heating press 26 is in the open position 42. Plastic piece 12 is positioned on second heating element 30 so that one of its sides, 16 or 18, abuts second heating element heated side 36. It is understood that, if plastic piece 12 is pre-laminated on the side, 16 or 18, proximate second heating element 30, then lamination 22 abuts second heating element heated side 36.

Next, press means 32 is activated and heating press 26 moves from the open position 42 to the closed position 44. In the closed position 44, each plastic piece side, 16 and 18, abuts one of first and second heating element heated sides, 34 and 36. Thus, first and second heating element heated sides, 34 and 36, compress or "sandwich" plastic piece 12 therebetween, providing conductive heating to both of the sides, 16 and 18, of plastic piece 12. It is understood that, if plastic piece 12 is pre-laminated on both sides, 16 or 18, then lamination 22 abuts first heating element heated side 34 as well as second heating element heated side 36.

In the preferred embodiment, plastic piece 12 is marked at a specific location prior to the molding step of the process (which molding step follows the heating step). This mark is used to locate a reference point on plastic piece 12 so that plastic piece 12 may be correctly positioned for the molding step. Preferably, the marking step is executed during the heating step.

In the embodiment including heating press 26, heating press 26 includes a finder's mark 54 used to locate a reference point on the plastic piece 12, preferably the center 56, so that the plastic piece 12 may be correctly positioned for the next step of the molding process. Preferably, at least one finder's mark 54 is located on second heating element heated side 36.

In the preferred embodiment, finder's mark 54 comprises a finder's shape 55 and a finder's center 57. Finder's shape 55 comprises an outline of the circumference or perimeter (depending on the shape) of plastic piece 12. Each plastic piece 12 must be placed within the finder's shape 55 thereby ensuring that each plastic piece 12 is placed on the same relative place of second heating element heated side 36. Finder's center 57 preferably comprises a relatively small cylinder protruding from second heating element heated surface 36 and located on the center of finder's shape 55. In this embodiment, first heating element heated surface 34 must include a notch 59 which receives finder's center 57 therein when heating press 26 is in the closed position 42, allowing first and second heating element heated surfaces, 34 and 36, to abut.

After the plastic piece 12 has been heated by heating press 26 for a predetermined and adequate period of time and at a pre-determined and adequate temperature, heating press 26 is moved from closed position 44 into open position 42.

In the preferred embodiment, press means 32 includes a first automatic disengagement means 58 which releases the heating press 26 from the closed position 44 into the open position 42 once plastic piece 12 has been heated for an adequate period of time and at an adequate temperature. In the preferred embodiment, first automatic disengagement means 58 includes a timer 60 which keeps track of the time for which heating press 26 is in the closed position 42.

Due to the heating provided by heating press 26, at this point, plastic piece 12 is flexible. Plastic piece 12 is then removed from heating press 26 by use of a removal tool 62 as shown in FIG. 7. Generally, removal tool 62 is shaped like a spatula, including a flat surface 64. The shape and size of removal tool flat surface 64 must be such that plastic piece 12 may be wholly positioned on removal tool flat surface 64. Removal tool flat surface 64 is then used to "scoop" plastic piece 12 from second heating element heated surface 36.

It is noted that the silicone coating of plastic piece 12 prevents the plastic piece 12 from adhering or sticking to first and second heating elements, 28 and 30, while heating press 26 is in the closed position 42. Thus, removal tool 62 easily removes plastic piece 12 from heating press 26. In the embodiment in which plastic piece 12 does not include silicone coating, first and second heating element heated surfaces, 34 and 36, must be coated with a liquid silicone film (not shown) for the same purpose.

It is further noted that heated plastic piece 12 now includes a center mark 61 on its center provided by finder's center 57 during the heating step. Center mark 61 enables a user to correctly position or "center" plastic piece 12 in the next step of the process, the press-molding step.

Once plastic piece 12 is removed from heating press 26 by use of removal tool 62, plastic piece 12 is deposited on a molding mechanism 100 and is therein molded into its end-shape. It is understood that plastic piece 12 is still flexible at this point. By use of center mark 61, plastic piece 12 is preferably centered on molding mechanism 100 during the depositing step.

Molding mechanism 100 may comprise any of a variety of press-molding techniques and molds. Preferably, molding mechanism 100 comprises a male mold section 102, a female mold section 104, and a press molding means 106. Generally, plastic piece 12 is deposited by removal tool 62 on male mold section 102. Press molding means 106 then compresses female mold section 104 and male mold section 102 with plastic piece 12 therebetween.

Male mold section 102 and female mold section 104 are sized and shaped to be selectively mateable. The size and shape of male mold section 102 and female mold section 104 depends on the end-size and end-shape of the plastic piece 12 as desired by the user.

In one embodiment, male mold section 102 comprises a central portion 108 and at least one leg 110. Male mold central portion 108 is generally cylindrical in shape having a circular top surface 112, a circular bottom surface 114, and a side surface 116. In the preferred embodiment, the cross-sectional diameter of male mold central portion top and bottom surfaces, 112 and 114, is longer than the male mold central portion side surface 116. In addition, male mold central portion 108 includes an axis 118 coinciding with the longitudinal axis of cylindrical male mold section central portion 108.

Each leg 110 preferably extends from and is attached to male mold section central portion side surface 116. In the preferred embodiment, each leg 110 extends from and is attached to male mold section central portion side surface 116 at an acute angle in relation to male mold central portion axis 118. Each leg 110 is attached to male mold section side surface 116 by any of a number of well-known attachment means, such as cooperating bolts and nuts.

In the preferred embodiment, at least one leg 110 comprises a plurality of legs 110. In this embodiment, legs 110 are spaced an equal distance away from each other about male mold section central portion axis 118.

In the embodiment in which heating press 26 includes finder's mark 54, male mold section 102 also includes a centering mechanism 146. Centering mechanism 146 ensures the correct placement of plastic piece 12 on male mold section 102.

In the preferred embodiment as shown in FIGS. 9–11, centering mechanism 146 comprises a spring 148, a pin 150, and a slot 152. Slot 152 is located on the center of male mold section central portion top surface 112. Pin 150 is disposed within slot 152 and is biased upwards by spring 148. Preferably, spring 148 comprises a helical spring, and pin 150 is inserted within the inner diameter of the helical spring. Based on the biasing action provided by spring 148, pin 150 includes two positions: an extended position 154 shown in FIG. 10, in which pin 150 extends from slot 152 and protrudes from male mold section central portion top surface 112, and a retracted position 156 shown in FIG. 11, in which pin 150 is retracted into slot 152 and does not protrude from male mold section central portion top surface 112. Extended position 154 is the initial position of pin 150 in which no forces act against it. Retracted position 156 is the position of pin 150 which results from a vertical force acting downward on pin 150.

In the embodiment in which male mold section 102 comprises a central portion 108 and at least one leg 110, female mold section 104 also comprises a central portion 120 and at least one leg 122. Female mold central portion 120 is generally cylindrical in shape having a circular top surface 124, a circular bottom surface 126, and a side surface 128. In the preferred embodiment, the cross-sectional diameter of female mold central portion top and bottom surfaces, 124 and 126, is longer than the female mold central portion side surface 128. In addition, female mold section central portion 120 includes an axis 130 coinciding with the longitudinal axis of cylindrical female mold section central portion 120.

Each leg 122 preferably extends from and is attached to female mold section central portion side surface 128. In the preferred embodiment, each leg 122 extends from female mold section central portion side surface 128 at an acute angle in relation to female mold central portion axis 130.

In the preferred embodiment, at least one female mold section leg 122 comprises a plurality of female mold section legs 122. In this embodiment, legs 122 are spaced an equal distance away from each other about female mold section central portion axis 130. In the preferred embodiment, the number of female mold section legs 122 is equal to the number of male mold section legs 110.

In the preferred embodiment, press molding means 106 selectively moves male mold section 102 and female mold section 104 to and from a pressed position 132 (see FIG. 12), in which female mold section bottom surface 126 abuts male mold section top surface 112, and a pulled position 134 (see FIG. 3), in which female mold section bottom surface 126 is displaced a distance away from male mold section top surface 112. Thus, male mold section 102 and female mold section 104, as well as their component parts, must be sized and constructed to allow such abutment.

In one preferred embodiment, press molding means 106 comprises a second compression means 136. In this embodiment, in the pulled position 134, a second cylinder 138, such as a pneumatic or hydraulic cylinder, maintains female mold section 104 a vertical distance 140 away from male mold section 102 so that female mold section central portion bottom surface 126 is proximate to male mold section central portion top surface 112. Second cylinder 138 brings female mold section 104 into (the pressed position 132) and out of (the pulled position 134) abutment with male mold section 102.

Preferably, in this embodiment, female mold section bottom surface 126 is substantially parallel to male mold section top surface 112 when press molding means 106 is in the pulled position 134. It is understood that female mold section bottom surface 126 must always be parallel to male mold section top surface 112 when both sections, 102 and 104, are in abutment in the pressed position 132.

Also preferably, in this embodiment, male mold section central portion axis 118 coincides with female mold section central portion axis 130. Thus, male mold section central portion 108 is preferably concentric with female mold section central portion 120. Furthermore, in the preferred embodiment, the cross-sectional diameter of female mold section central portion bottom surface 126 is equal to the cross-sectional diameter of male mold section central portion top surface 112.

It is noted that female mold section 104 and male mold section 102 do not rotate about their respective axes, 118 and 130, as press molding means 106 moves molding mechanism 100 to and from pressed position 132 and pulled position 134. Thus, the number and position of male mold section leg(s) 110 in relation to the number and position of female mold section leg(s) 122 is important in determining the end-shape of plastic piece 12.

In one embodiment as previously disclosed, the number of male mold section leg(s) 110 is equal to the number of female mold section leg(s) 122. Preferably, in this embodiment, the position of male mold section leg(s) 110 in relation to the position of female mold section leg(s) 122 is such that, when molding mechanism 100 is in the pressed position 132, each female mold section leg 122 is intermediate two male mold section legs 110. Also preferably in this embodiment, when molding mechanism 100 is in the pressed position 132, each female mold section leg 122 is centered between two male mold section legs 110.

The placement of plastic piece 12 on male mold section 102 is critical to the process. In the preferred embodiment including finder's mark 54 on second heating element 30 and centering mechanism 146 on male mold section 102, plastic piece 12 is placed on male mold section 102 so that center mark 61 (on plastic piece 12) is directly over centering mechanism 146. Centering mechanism 146 is easily detectible underneath plastic piece 12 since, in the initial and extended position 154, pin 150 protrudes from male mold section central portion top surface 112 and thereby creates an indentation on flexible and heated plastic piece 12.

Once plastic piece 12 is correctly positioned, or centered, on molding mechanism 100, press molding mechanism 106 is activated and moves from pulled position 134 to pressed position 132, wherein female mold section 104 abuts male mold section 102. It is noted that, as molding mechanism 100 moves into the pressed position 132, female mold section central portion bottom surface 126 eventually contacts plastic piece 12 and forces pin 150 from its initial extended position 154 into the retracted position 156.

After the plastic piece 12 has been molded by molding mechanism 100 for an adequate period of time and at an adequate pressure, molding mechanism 100 is moved from pressed position 132 into pulled position 134.

In the preferred embodiment, press molding means 106 includes a second automatic disengagement means 142 which releases the molding mechanism 100 from the pressed position 132 into the pulled position 134 once plastic piece 12 has been molded for an adequate period of time and at an adequate pressure. In the preferred embodiment, second automatic disengagement means 142 includes a timer 144 which keeps track of the time for which molding mechanism 100 is in the pressed position 132.

Next, the plastic piece 12 is cooled by a cooling mechanism 200. It is noted that, while molding mechanism 100 is in the pressed position 132, plastic piece 12 remains substantially at the relatively high temperature provided by heating press 26. Furthermore, having substantially the relatively high temperature provided by heating press 26, plastic piece 12 remains at least semi-flexible. Cooling mechanism 200 serves to cool and stabilize semi-flexible plastic piece 12 into its end-shape.

In the preferred embodiment, cooling mechanism 200 comprises an air cooling mechanism 202, such as a fan 204.

Fan 204 is preferably disposed underneath male mold section 102 between male mold section central portion bottom surface 114 and male mold section leg(s) 110. Preferably, air cooling mechanism 202 is activated while molding mechanism 100 is still in the pressed position 132. In the preferred embodiment, air cooling mechanism 202 includes an engagement means 206 which activates air cooling mechanism 202 at the appropriate time as well as a third automatic disengagement means 208 which deactivates air cooling mechanism 202 at the appropriate time. Preferably, the appropriate time for the activation and deactivation of air cooling mechanism 202 is kept by timer 144.

The foregoing disclosure and description of the invention is illustrative and explanatory thereof. Various changes in the details of the illustrated construction may be made within the scope of the appended claims without departing from the spirit of the invention. The present invention should only be limited by the following claims and their legal equivalents.

I claim:

1. A method for forming a two-sided piece of plastic, said method comprising the sequential steps of:

contact heating said plastic piece on each of said two sides;

press-molding said heated plastic piece into a desired end-shape utilizing a pressing means, a male mold and female mold; said male mold including a central portion having a top surface, a bottom surface, a side surface and a plurality of shaping legs spaced and extending radially and angularly outward from the male mold side surface; said female mold including a central portion having a top surface, a bottom surface, a side surface and a plurality of shaping legs spaced and extending radially and angularly outward from the female mold side surface; said heated plastic piece being molded by said male mold shaping legs and said female mold shaping legs; and forced air cooling said press-molded plastic piece in said desired end-shape while said plastic piece remains press-molded between said male and female molds.

2. A method as claimed in claim 1, wherein said plastic piece includes lamination on at least one of said two sides.

3. A method as claimed in claim 1, further comprising cutting said plastic piece from a plastic sheet prior to said contact heating step:

wherein said cutting step comprising cutting said plastic piece into a specific shape partially dictating said desired end-shape.

4. A method as claimed in claim 1, wherein said contact heating step comprising:

placing said plastic piece on a heating press; and activating said heating press so that said heating press contact heats each of said plastic piece two sides.

5. A method as claimed in claim 4, wherein:

said heating press including a first and a second heating element; and said contact heating step comprising placing said plastic piece on said first heating element and activating said heating press so that said second heating element and said first heating element move into substantial abutment with said plastic piece therebetween.

6. A method as claimed in claim 5, further comprising:

timing said contact heating step to last a pre-determined period of time;

measuring the temperature of said heating press during said contact heating step; and setting said temperature at a pre-determined level for the duration of said contact heating step.

7. A method as claimed in claim 6, further comprising coating said plastic piece with a silicone coating on both of said two sides prior to said contact heating step.

8. A method as claimed in claim 6, further comprising coating said first and second heating elements with a liquid silicone film prior to said placing step.

9. A method as claimed in claim 1, wherein said press molding step comprising:

depositing said heated plastic piece on a molding mechanism including mateable male and female mold sections; and compressing said male mold section against said female mold section with said plastic piece therebetween.

10. A method as claimed in claim 9, further comprising:

marking said plastic piece with a mark prior to said press-molding step;

said depositing step further comprising positioning said plastic piece on said molding mechanism in relation to said mark;

said depositing step including placing said plastic piece on a molding mechanism surface;

said positioning step comprising positioning said mark over a pin on said molding mechanism surface; and biasing said pin by spring means to extend above said molding mechanism surface whereby said pin creates an indentation on said plastic piece.

11. A method as claimed in claim 10, wherein said marking step executed during said contact heating step.

12. A method as claimed in claim 10, further comprising timing said press molding step to last a pre-determined period of time.

13. A method as claimed in claim 10, wherein:

said marking step comprising marking said plastic piece with a center mark prior to said press-molding step; and said positioning step further comprising centering said plastic piece on said molding mechanism in relation to said center mark.

14. A method as claimed in claim 13, wherein:

said molding mechanism including a centering mechanism; and said depositing step further comprising centering said plastic piece so that said center mark is directly over said centering mechanism.

15. A method as claimed in claim 1, wherein said air cooling step comprising air cooling said heated plastic piece with a fan.

16. A method as claimed in claim 15, further comprising timing said air cooling step to last a predetermined period of time.

17. A method as claimed in claim 1, wherein:

said shaping legs on the male mold are equally spaced around the radial plane of said central portion of the male mold, and said shaping legs on the female mold are equally spaced around the radial plane of said central portion of the female mold.

* * * * *